(12) United States Patent
Miller et al.

(10) Patent No.: US 6,882,923 B2
(45) Date of Patent: Apr. 19, 2005

(54) ADAPTIVE CRUISE CONTROL SYSTEM USING SHARED VEHICLE NETWORK DATA

(75) Inventors: Ronald Hugh Miller, Saline, MI (US); Medville Jay Throop, Ann Arbor, MI (US); Rena Hecht Basch, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 164 days.

(21) Appl. No.: 10/065,440

(22) Filed: Oct. 17, 2002

(65) Prior Publication Data

US 2004/0078133 A1 Apr. 22, 2004

(51) Int. Cl.[7] .............................................. G06F 19/00
(52) U.S. Cl. ........................... 701/96; 701/70; 701/301; 342/70; 342/71; 342/45; 180/169; 180/170; 340/436
(58) Field of Search ............................. 701/96, 301, 93, 701/70, 98, 1, 97; 342/70, 71, 72, 130, 107, 109, 128, 27, 28, 69, 45; 180/169, 170, 179, 167, 168; 123/352; 340/436, 903, 435, 933, 935, 907, 438; 318/3

(56) References Cited

U.S. PATENT DOCUMENTS

| | | | |
|---|---|---|---|
| 5,572,449 A | | 11/1996 | Tang et al. |
| 5,594,645 A | * | 1/1997 | Nishimura et al. ........... 701/96 |
| 5,749,426 A | | 5/1998 | Gilling |
| 6,178,372 B1 | * | 1/2001 | Tabata et al. ................. 701/97 |
| 6,233,515 B1 | | 5/2001 | Engelman et al. |
| 6,256,574 B1 | | 7/2001 | Prestl et al. |
| 6,285,153 B1 | | 9/2001 | Sielagoski et al. |
| 6,311,121 B1 | | 10/2001 | Kuragaki et al. |
| 6,324,465 B1 | * | 11/2001 | Teramura et al. ............. 701/96 |
| 6,516,262 B1 | * | 2/2003 | Takenaga et al. ............. 701/96 |
| 6,546,327 B1 | * | 4/2003 | Hattori et al. ................. 701/96 |
| 2002/0039472 A1 | * | 4/2002 | Takeuti et al. ................. 385/84 |

* cited by examiner

Primary Examiner—Thomas G. Black
Assistant Examiner—Ronnie Mancho
(74) Attorney, Agent, or Firm—Frank A. MacKenzie

(57) ABSTRACT

A method of adaptively controlling the speed of a reference vehicle having a controller is provided. The method includes detecting a target vehicle, setting a reference vehicle headway distance indicative of a desired separation between the reference vehicle and the target vehicle, receiving at the reference vehicle, target vehicle data from the target vehicle, and modifying the reference vehicle headway distance as a function of the target vehicle data. The target vehicle data includes a braking capability value ($BC_T$) of the target vehicle. A braking capability value ($BC_R$) for the reference vehicle is also determined. If the $BC_R$ or $BC_T$ indicates a less than optimum braking capability for the reference or target vehicles, the reference vehicle headway distance is increased. In this way, the relative braking capability of the two vehicles is used to modify the reference vehicle headway distance during adaptive cruise control operation.

20 Claims, 5 Drawing Sheets

ADAPTIVE CRUISE CONTROL SYSTEM USING SHARED VEHICLE NETWORK DATA

CROSS REFERENCE TO RELATED APPLICATIONS

The present invention is related to U.S. Pat. No. 6,609,066 entitled "Method and Apparatus for Activating A Crash Countermeasure In Response To The Braking Capability Of A Vehicle" issued on Aug. 19, 2003 and hereby incorporated by reference.

BACKGROUND OF INVENTION

1. Technical Field

The present invention relates to adaptive cruise control sensing systems for automotive vehicles, and more particularly, to a method and apparatus for adjusting vehicle speed and inhibiting vehicle headway distance to a detected vehicle in response to shared vehicle network data such as the braking potential of proximate vehicles.

2. Background of the Invention

Adaptive Cruise Control (ACC) has reached a level of technical and business readiness such that it is beginning to appear in the consumer market as a comfort and convenience system. Consumer technical enthusiasm for ACC has increased because of their interest in intelligent vehicles and systems such as collision warning and collision avoidance. ACC performs as an enhancement to traditional cruise control by automatically adjusting a set speed, which is set by the vehicle operator, to allow a vehicle to adapt to moving traffic.

Under normal driving conditions the ACC system is engaged with a set speed equal to a maximum autonomous speed that is desired by the operator and the ACC system operates in a conventional cruise control mode. When the vehicle approaches traffic, the ACC system automatically adjusts the set speed to follow the traffic at a desired headway distance. This is usually a fixed parameter such as a one-second lead time. When the traffic clears or the vehicle changes lanes, the ACC system slowly resumes the speed of the vehicle to the set speed. When the vehicle approaches slow traffic, the ACC system is automatically disengaged and the operator manually follows slower vehicles in the slow traffic. When the slow traffic is no longer in front of the vehicle, the operator pushes the resume button and the ACC system accelerates the vehicle back to the set speed.

Auto manufacturers are also investigating radar, lidar, and vision-based pre-crash sensing systems to improve occupant safety. Current vehicles typically employ accelerometers that measure forces acting on the vehicle body. In response to accelerometers, airbags or other safety devices are employed. Also, Global Position Systems (GPS) systems are used in vehicles as part of navigation systems.

In certain crash situations, it would be desirable to provide information to the vehicle operator before forces actually act upon the vehicle. As mentioned above, known systems employ combinations of radar, lidar and vision systems to detect the presence of an object in front of the vehicle a predetermined time before an actual crash occurs. Other systems broadcast their positions to other vehicles via an inter-vehicle wireless network, and the positions are displayed to the vehicle operator.

It would be desirable to provide an adaptive cruise control system that takes into consideration the position of other vehicles as provided by the inter-vehicle wireless network and, should the situation warrant, optimize the adaptive cruise control functioning with respect to the shared vehicle data.

SUMMARY OF INVENTION

The present invention provides an improved adaptive cruise control (ACC) system that employs shared vehicle data to optimize the desired headway distance.

A method of adaptively controlling the speed of a reference vehicle having a controller is provided. The method includes detecting a target vehicle, setting a reference vehicle headway distance indicative of a desired separation between the reference vehicle and the target vehicle, receiving at the reference vehicle, target vehicle data from the target vehicle, and modifying the reference vehicle headway distance as a function of the target vehicle data. The target vehicle data includes a braking capability value ($BC_T$) of the target vehicle. A braking capability value ($BC_R$) for the reference vehicle is also determined. If the $BC_R$ or $BC_T$ indicates a less than optimum braking capability for the reference or target vehicles, the reference vehicle headway distance is increased. In this way, the relative braking capability of the two vehicles is used to modify the reference vehicle headway distance during adaptive cruise control operation.

In another aspect of the invention, an adaptive cruise control system for a reference vehicle is provided. The system includes a memory for storing reference vehicle data, a detection system for detecting a target vehicle, a receiver for receiving target vehicle data from the detected target vehicle, and a controller coupled to the memory. The controller is adapted to control a speed of the reference vehicle to maintain a reference vehicle headway distance indicative of a desired separation between the reference vehicle and the target vehicle. The reference vehicle headway distance is generated as a function of the reference vehicle data and the target vehicle data. The reference and target vehicle data can include a braking capability value ($BC_R$) for the reference vehicle, and a braking capability value ($BC_T$) for the target vehicle, respectively.

Other aspects and features of the present invention will become apparent when viewed in light of the detailed description of the preferred embodiment when taken in conjunction with the attached drawings and appended claims.

DETAILED DESCRIPTION

Figure 1:
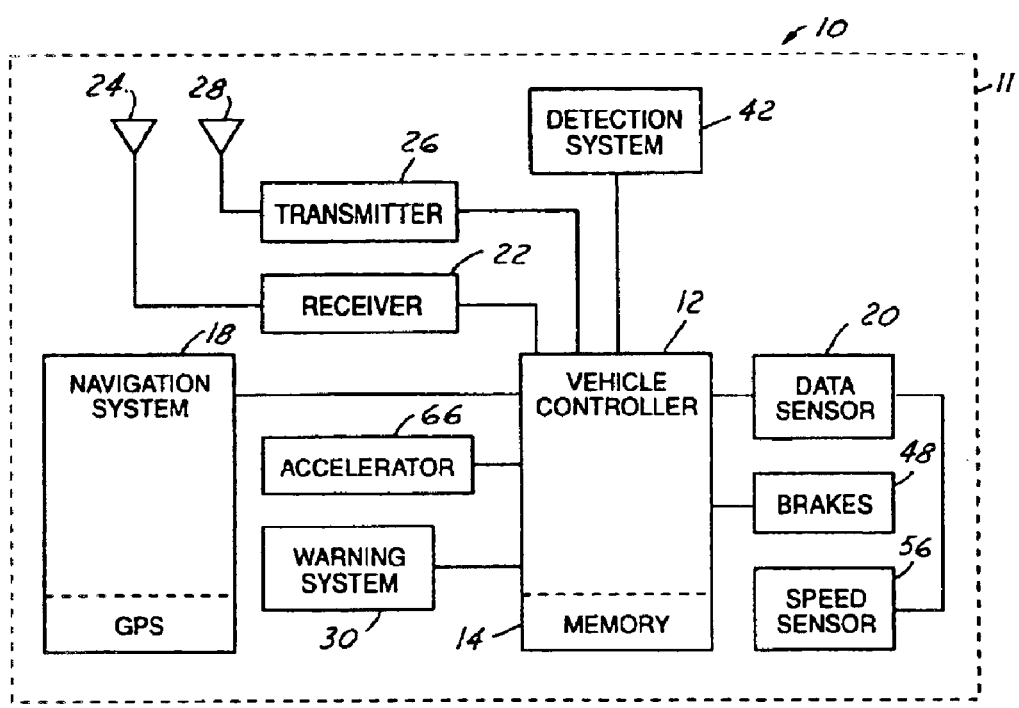
FIG. 1 is a simplified block diagrammatic view of an ACC system in accordance with one embodiment of the present invention.

While the present invention is described with respect to an apparatus and method for adaptively adjusting the speed of an automotive vehicle using a control system the following apparatus and method is capable of being adapted for various purposes and is not limited to the following applications: cruise control systems, forward collision warning systems, collision avoidance systems, vehicle systems, or other systems that may require adaptive speed control.

In the following description, various operating parameters and components are described for one constructed embodiment. These specific parameters and components are included as examples and are not meant to be limiting. Also, the same reference numerals are used to identify like components in the various views.

Referring now to FIG. 1, a block diagrammatic view of a control system 15 located in an automotive vehicle 11 according to an embodiment of the present invention is shown.

The system 10 includes a vehicle controller 12 that is preferably microprocessor-based. Controller 12 is illustrated having a memory 14 therein for storing information related to vehicle position, object detection, and vehicle data. However, memory 14 may also be a separate component. The controller 12 receives signals from several sensors and systems.

The controller 12 receives a detected object profile from a detection system 42. Although the detection system 42 of the present invention is preferably radar-based the detection system 42 may be laser based, infrared based, x-ray based, or based off other detection methods known in the art. The object profile consists of an object location relative to the vehicle 11 and a road the vehicle 11 is being operated on. The object profile also consists of distance between the object and the vehicle 11 and the speed of the object relative to the speed of the vehicle 11.

The controller is coupled to a receiver 22 coupled to a receiving antenna 24 and may also be coupled to a transmitter 26 coupled to a transmitting antenna 28 to establish a vehicle-to-vehicle network as described in more detail below with respect to FIG. 3.

The controller 12 is also coupled to a sensor block 20 that represents various vehicle sensors. Thus, the controller 12 measures the yaw rate of the vehicle 11 using a yaw rate sensor, which represents the level of curvature of a road that the vehicle 11 is being operated on. A curved road may be an entrance ramp, an exit ramp, or other curved road.

The controller 12 also determines the velocity of the vehicle 11 using a speed signal provided by speed sensor 56. Although the speed sensor is illustrated as a single sensor, various numbers of sensors may be employed. A suitable speed sensor employs four sensors, each located at a respective wheel. The speed of the vehicle may be obtained therefrom in a known way similar to that of an anti-lock braking system.

Additionally, the controller 12 receives a navigation signal from a navigation system 18. The navigation signal may include vehicle position and location as determined by a Global Positioning System. The navigation signal may also include but is not limited to: vehicle position, speed category, future vehicle path, landmark location, road curvature, overhead object location, bridge location, construction zone, number of lanes, road type, road inclination, road conditions or other data that may effect whether to adjust the speed of the vehicle.

The controller 12 in response to the object profile, the yaw rate, the speed of the vehicle 11, and the navigation signal determines an operating mode of the system 10. Some of the operating modes are as follows: follow mode, cruise mode, auto resume mode, or inhibit resume mode. Follow mode is when the system 10 is continuously adjusting the speed of the vehicle 11 to remain a headway or predetermined distance from a target vehicle in the future path of the vehicle 11. During cruise mode the system 10 is continuously adjusting the speed of the vehicle 11 to remain at a set speed. During auto resume mode the system 10 is slowly accelerating the vehicle 11 to a set speed. During inhibit resume mode the system 10 is not accelerating the vehicle 11. After determining the system operating mode, the system 10 using the vehicle accelerator 66 or brakes 48 adjusts the speed of the vehicle 11 accordingly. The system 10 may use the vehicle accelerator 66 or may use a mechanical or electrical throttle control device in adjusting the speed of the vehicle 11. The controller 12 may use a warning system 30 to alert the operator of impeding objects in response to the object profile, the yaw rate, the speed at the vehicle, the navigation signal, and the operating mode.

Figure 2:
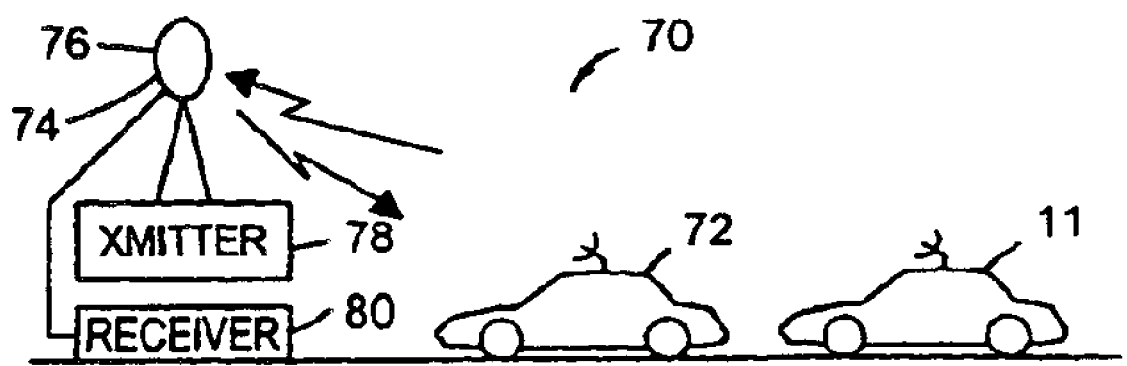
FIG. 2 is a block diagrammatic view of one embodiment of a vehicle network established by the present system.

Referring now to FIG. 2, vehicle 11 may be part of a network 70 in conjunction with a second vehicle or various numbers of vehicles represented by reference numeral 72. Vehicle 72 preferably is configured in a similar manner to that of vehicle 11 shown in FIG. 1. Vehicle 72 may communicate directly with vehicle 11 through transmitter 26' and receiver 22' to form a wireless local area network. The network 70 may also include a repeater 74 through which vehicle 11 and vehicle 72 may communicate. Repeater 74 has an antenna 76 coupled to a transmitter 78 and a receiver 80. Various information can be communicated through network 70. For example, vehicle data, position data, and sensor data may all be transmitted to other vehicles throughout network 70. For ACC purposes, vehicle 11 is referred to as the reference vehicle and vehicle 72 is referred to as the target vehicle.

Figure 3:
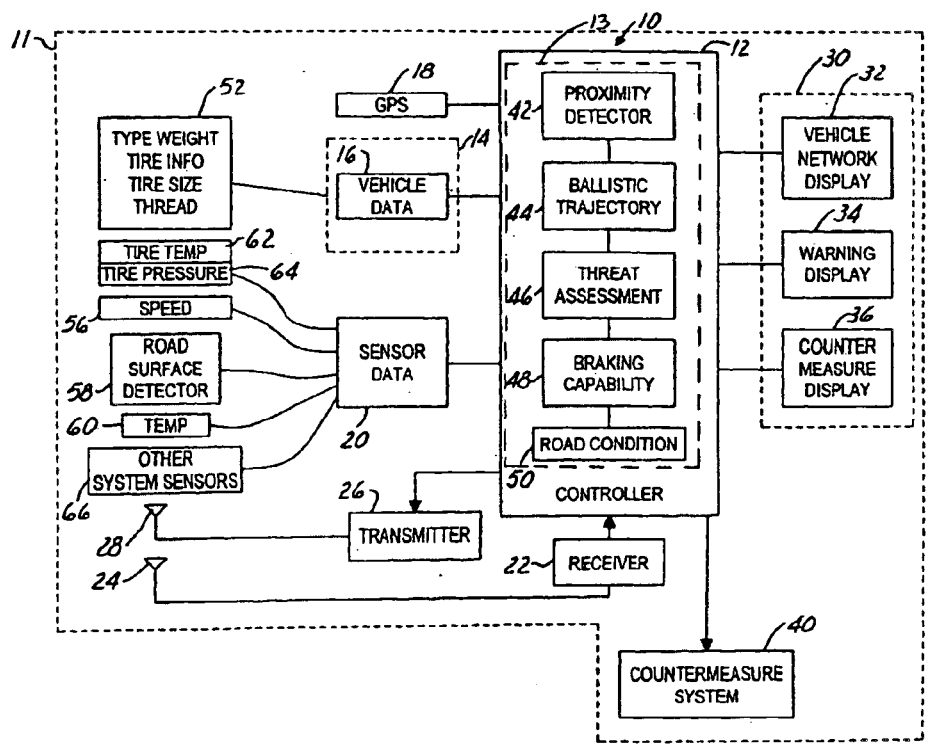
FIG. 3 is a block diagrammatic view of a vehicle pre-crash sensing system including an ACC system according to one embodiment of the present invention.
Figure 4:
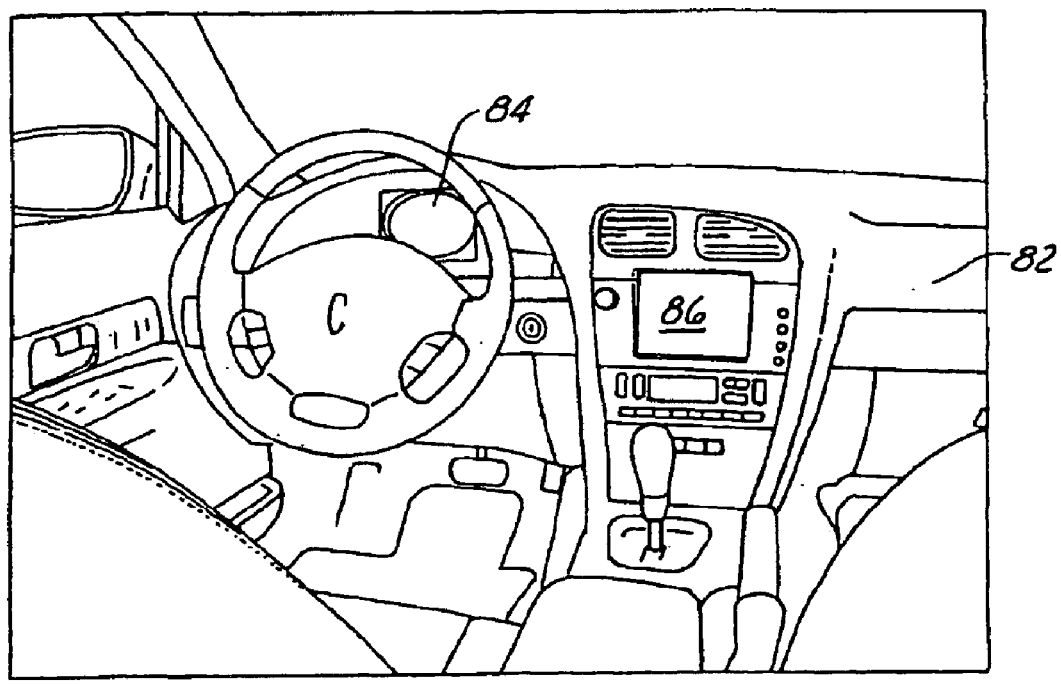
FIG. 4 is a perspective view of an automotive vehicle instrument panel display for use with the present invention.

Referring now to FIG. 3, there is shown one example of a vehicle pre-crash sensing system which includes the ACC system 10 of the present invention as described with reference to FIGS. 1 and 2. The example of FIG. 3 provides specific details regarding a preferred vehicle pre-crash sensing system which includes a vehicle-to-vehicle shared data network. The present ACC system, however, is not limited to use in such a vehicle pre-crash sensing system. Rather, the present ACC system may be implemented in any vehicle which includes share vehicle braking data across a wireless network. The example of FIG. 3 is one such system. To the extent like components have been described with reference to FIG. 1, reference is made thereto. To the extent further details are beneficial, they will be described herein with respect to FIG. 3.

The system 10 for an automotive vehicle 11 has a controller 12. Controller 12 is preferably a microprocessor-based controller that is coupled to a memory 14. Controller 12 has a CPU 13 that is programmed to perform various tasks. Memory 14 is illustrated as a separate component from that of controller 12. However, those skilled in the art will recognize that memory may be incorporated into controller 12.

Memory 14 may comprise various types of memory including read only memory, random access memory, electrically erasable programmable read only memory, and keep alive memory. Memory 14 is used to store various thresholds and parameters including vehicle data 16 as illustrated.

Controller 12 is coupled to a global positioning system 18 that receives position data triangulated from satellites as is known to those skilled in the art.

Controller 12 is coupled to a sensor data block 20 that represents various sensors located throughout the vehicle. The various sensors will be further described below.

Controller 12 may also be coupled to a receiver 22 coupled to a receiving antenna 24 and a transmitter 26 coupled to a transmitting antenna 28.

Controller 12 is also coupled to a display 30 that may include various types of displays including a vehicle network display, a warning display 34, and a counter-measure display 36. As should be noted, display 30 may be a single display with different display features or may be individual displays and may include audible warnings as well.

Controller 12 has various functional blocks illustrated within CPU 13. Although these functional blocks may be represented in software, they may also be carried out in hardware. As will be further described below, controller 12 has a proximity detector 42 that is used to determine the proximity of the various vehicles around automotive vehicle 11. The proximity detector generates an object detection signal which is used, as described below, to control the headway distance of the ACC. A vehicle trajectory block 44 is used to determine the trajectory of the vehicle and surrounding vehicles. Based upon the vehicle trajectory block 44, a threat assessment is made in functional block 46. Of course, threat assessment 46 takes into consideration various vehicle data 16 and sensor data from sensor block 20. Threat assessment 46 may be made based upon the braking capability of the present vehicle and surrounding vehicles in block 48 and also road conditions of the present vehicle and surrounding vehicles in block 50. As will be further described below, the road conditions of block 50 may be used to determine the braking capability in block 48.

In block 16, various vehicle data are stored within the memory. Vehicle data represents data that does not change rapidly during operation and thus can be fixed into memory. Various information may change only infrequently and thus may also be fixed into memory 14. Vehicle data includes but is not limited to the vehicle type, which may be determined from the vehicle identification number, the weight of the vehicle and various types of tire information. Tire information may include the tire and type of tread. Such data may be loaded initially during vehicle build and may then manually be updated by a service technician should information such as the tire information change.

Global positioning system (GPS) 18 generates a position signal for the vehicle 11. Global positioning system 18 updates its position at a predetermined interval. Typical interval update periods may, for example, be one second. Although this interval may seem long, the vehicle position may be determined based upon the last up update from the GPS and velocity and acceleration information measured within the vehicle.

Sensor data 20 may be coupled to various sensors used in various systems within vehicle 11. Sensor data 20 may include a speed sensor 56 that determines the speed of the vehicle. Speed sensor may for example be a speed sensor used in an anti-lock brake system. Such sensors are typically comprised of a toothed wheel from which the speed of each wheel can be determined. The speed of each wheel is then averaged to determine the vehicle speed. Of course, those skilled in the art will recognize that the vehicle acceleration can be determined directly from the change in speed of the vehicle. A road surface detector 58 may also be used as part of sensor data 20. Road surface detector 58 may be a millimeter radar that is used to measure the road condition. Road surface detector 58 may also be a detector that uses information from an anti-lock brake system or control system. For example, slight accelerations of the wheel due to slippage may be used to determine the road condition. For example, road conditions such as black ice, snow, slippery or wet surfaces may be determined. By averaging microaccelerations of each tire combined with information such as exterior temperature through temperature sensor 60, slippage can be determined and therefore the road conditions may be inferred therefrom. Such information may be displayed to the driver of the vehicle. The surface conditions may also be transmitted to other vehicles.

Vehicle data 16 has a block 52 coupled thereto representing the information stored therein. Examples of vehicle data include the type, weight, tire information, tire size and tread. Of course, other information may be stored therein.

Sensor data 20 may also include a tire temperature sensor 62 and a tire pressure sensor 64. The road condition and the braking capability of the vehicle may be determined therefrom.

Other system sensors 66 may generate sensor data 20 including steering wheel angle sensor, lateral acceleration sensor, yaw sensor, longitudinal acceleration sensor, gyroscopic sensors and other types of sensors. Other system sensors 66 may additionally include an operator attention system which provides a modifying value to the braking capability system 48 if the driver of the reference vehicle is distracted. Thus, the attention of the driver can be factored into the braking capability value. The operator attention system can indicate that the driver is potentially distracted and, thus, less likely to react to a vehicle braking situation. In such cases, the vehicle headway distance can be increased with respect to the target vehicle. Distraction indicators can include operation of the audio controls, wireless phone operation, manipulation of any of the vehicle comfort features (seat or mirror adjustments in progress) or other, similar indicators of potential operator distraction. In a similar manner, any distractions on the part of the target vehicle operator can be accounted for in the target vehicle braking capability value.

Similar vehicle data 16 and sensor data 20 is received from detected vehicles within the vehicle network by way of the receiver 22. In particular, the vehicle type, weight, tire information, tire size, tire pressure, tire temperature, road conditions, vehicle speed, and braking capability of the vehicle being followed by the reference vehicle is received. From this information, a braking capability value for the target vehicle can be determined by the controller 13. Alternatively, the target vehicle can transmit only a braking capability value to the reference vehicle 11. This value represents a scaling factor by which the ACC system of the vehicle 11 adjusts its reference headway distance value to account for the braking capability of the target vehicle. Headway distance modification is described in more detail below with reference to FIG. 5.

Referring now to FIG. 3, an instrument panel 82 is illustrated having a first display 84 and a second display 86. Either displays 84, 86 may be used generate various information related to the pre-crash sensing system and ACC system. For example, when the braking capability of either the reference vehicle 11 or target vehicle 72 is less than optimum due to road conditions or otherwise, the displays 84, 86 may indicate a warning or notice.

Referring again to FIG. 3, the vehicle network display 32 may include a map 88, a reference vehicle indicator, and a target vehicle indicator. First vehicle indicator corresponds to the vehicle in which the pre-crash sensing system is while target vehicle indicator corresponds to an approaching vehicle. Vehicle network display 32 may be displayed when a vehicle is near but beyond a certain distance or threat level.

Warning display 34 in addition to the display information shown in vehicle network display in FIG. 3, can include a warning indicator and a distance indicator. The distance indicator provides the vehicle operator with an indication of the distance from a target vehicle. The warning display 34 may be indicated when the vehicle is within a predetermined distance or threat level more urgent than that of vehicle network display 32.

A counter-measure display 36 can indicate to the vehicle operator that a counter-measure is being activated because the threat level is high or the distance from the target vehicle is within a predetermined distance less than the distances needed for activation of the other displays.

Figure 5:
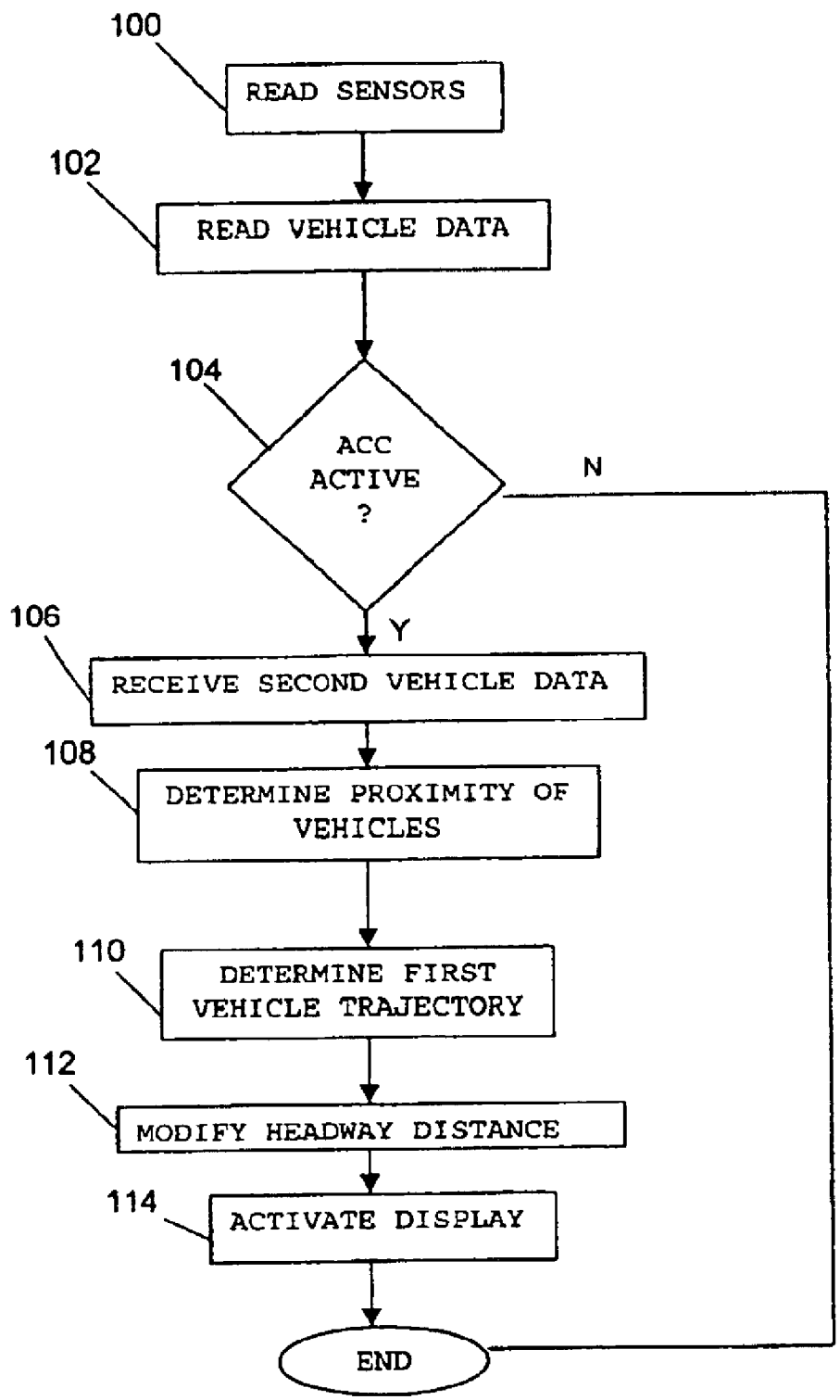
FIG. 5 is a flow chart of the operation of an ACC system according to one embodiment of the present invention.

Referring now to FIG. 5, one method for operating the ACC system in accordance with the present invention is described. In step 100, the various sensors for the system are read. In step 102, various vehicle data is read. In decision block 104, it is determined whether the ACC system is activated. If the ACC system is active, in step 106, the information from a detected, second vehicle is obtained. The second vehicle is the target vehicle, ahead of the reference vehicle, which is followed at a headway distance according to known ACC operating principles. The second vehicle information received is the braking capability of the second vehicle as described above. It may also be various information such as the speed, heading, vehicle type, position, tire data, and road conditions from the other vehicle or vehicles in the network. In step 108, the proximity of the first vehicle and second vehicle is determined. The proximity is merely a distance calculation. In step 110, the first vehicle trajectory relative to the second vehicle is determined. The first vehicle trajectory uses the information such as the positions and various sensors to predict a path for the first vehicle and the second vehicle. In step 112, the vehicle headway distance is modified as a function of the braking capabilities of the first vehicle and/or second vehicle. Headway distance may also be modified based upon conditions of the vehicle trajectory and vehicle type as well as based upon tire information which may provide indication as to the braking capability of the first vehicle and/or the second vehicle. Thus, the headway distance may be adjusted accordingly. Also, the road surface condition may also be factored into the headway adjustment. On clear, dry roads the headway distance may be shorter as compared with when the vehicle is operating under the same conditions with wet or snowy roads.

By factoring in the braking capability of the target vehicle, headway distance may be adjusted accordingly. Likewise, the braking capability of the reference vehicle may also be used in the headway distance modification. Similarly, the displays may also be updated in step 114 based upon the braking capabilities of the target vehicle and/or the reference vehicle. The braking capabilities may be determined from various tire type, size, tread, tire pressure, tire temperature, outside temperature as well as the road condition, vehicle speed and vehicle weight. The braking capability can also include a driver attention factor as described above. For example, the reference headway distance may be increased if either or both the reference and target vehicle operators are determined to be distracted from giving their full attention to driving.

Under normal operating conditions, when the reference vehicle ACC system is active, the system maintains a reference headway distance with a target vehicle. This is typically on the order of a one second separation. The relative and absolute speeds of the respective vehicles as well as the trajectories of both vehicles as determined by vehicle sensor data and shared vehicle data, is used to maintain the reference vehicle at the set speed while maintaining the reference headway distance.

The reference headway distance is then modified, in accordance with the present invention, as follows. If the braking capability of the reference vehicle is less than optimum, the reference headway distance is increased. Any number of factors, some of which are mentioned above as sensor data points, can compromise braking capability including, but not limited to: slippery road conditions, low tire pressure, excessive tire temperature, worn brakes, increased vehicle speed, or increased vehicle loading (weight). These factors or data points can be summed and/or weighted to determine a braking capability value ($BC_R$) for the reference vehicle. In a similar manner, either the sensor data from the target vehicle or, preferably, a braking capability value ($BC_T$) for the target vehicle is also received by the reference vehicle. If the braking capability value of the target vehicle indicates compromised braking capability of the target vehicle, the reference headway distance can be increased or safely decreased. In essence, the system takes into account the relative instantaneous potential stopping distances of the target vehicle and reference vehicle and adjusts the headway distance value such that a safe distance is maintained between the vehicles at all times during normal ACC operation. The more compromised the braking capability of the reference vehicle, or the more distracted the reference vehicle operator, the greater the headway distance. Conversely, the more compromised the target vehicle braking capability vis-à-vis the reference vehicle, the shorter the headway distance. A distracted target vehicle operator may also result in an increased headway distance with respect to a reference headway distance as a distracted driver may be more likely to react strongly or more unpredictably to a situation.

Advantageously, by connecting the vehicles through the network, various information may be known to drivers of other nearby vehicles. For example, the presence of black ice and other slippery conditions not readily apparent may be transmitted to other vehicles for avoidance thereof.

While particular embodiments of the invention have been shown and described, numerous variations and alternate embodiments will occur to those skilled in the art. Accordingly, it is intended that the invention be limited only in terms of the appended claims.

What is claimed is:

1. A method of adaptively controlling the speed of a reference vehicle having a controller comprising:
   detecting a target vehicle;
   setting a reference vehicle headway distance indicative of a desired separation between said reference vehicle and said target vehicle;
   receiving at said reference vehicle, by way of an inter-vehicle communication network, target vehicle data communicated from said target vehicle; and
   modifying said reference vehicle headway distance as a function of said target vehicle data.

2. A method according to claim 1 wherein said target vehicle data includes a braking capability value ($BC_T$) for said target vehicle, and wherein the step of modifying includes modifying said reference vehicle headway distance as a function of said $BC_T$.

3. A method according to claim 2 wherein modifying said reference vehicle headway distance includes increasing said reference vehicle headway distance if said $BC_T$ indicates lees than an optimum braking capability.

4. A method according to claim 1 wherein said target vehicle data includes data comprising at least one of: a tire pressure value; a tire size value; a tread wear value; a tire temperature value; a vehicle weight value; target vehicle speed; or a road condition value.

5. A method according to claim 1 wherein said target vehicle data includes a target vehicle operator attention value indicative of a level of potential target vehicle operator distraction.

6. A method according to claim 1 comprising:
  determining a braking capability value ($BC_R$) for said reference vehicle, and wherein said step of modifying includes modifying said reference vehicle headway distance as a function of said $BC_T$ and said $BC_R$.

7. A method according to claim 6 wherein determining said $BC_R$ comprises analyzing reference vehicle data comprising at least one of: a tire pressure value; a tire size value; a tread wear value; a tire temperature value; a vehicle weight value; reference vehicle speed; or a road condition value.

8. A method according to claim 7 wherein said reference vehicle data includes a reference vehicle operator attention value indicative of a level of potential reference vehicle operator distraction.

9. A method according to claim 6 wherein modifying said reference vehicle headway distance includes increasing said reference vehicle headway distance if said $BC_R$ indicates less than an optimum braking capability.

10. A method of adaptively controlling the speed of a reference vehicle having a controller comprising:
  detecting a target vehicle;
  setting a reference vehicle headway distance indicative of a desired separation between said reference vehicle and said target vehicle;
  receiving at said reference vehicle, a braking capability value ($BC_T$) for said target vehicle, by way of an inter-vehicle communication network;
  generating a braking capability value ($BC_R$) for said reference vehicle; and
  modifying said reference vehicle headway distance as a function of said $BC_T$ and said $BC_R$.

11. A method according to claim 10 wherein determining said $BC_R$ comprises analyzing reference vehicle data comprising at least one of: a tire pressure value; a tire size value; a tread wear value; a tire temperature value; a vehicle weight value; reference vehicle speed; or a road condition value.

12. A method according to claim 11 wherein said $BC_T$ is generated at said target vehicle as a function of target vehicle data comprising at least one of: a tire pressure value; a tire size value; a tread wear value; a tire temperature value; a vehicle weight value; reference vehicle speed; or a road condition value.

13. A method according to claim 10 wherein said $BC_T$ includes a target vehicle operator attention value indicative of a level of potential target vehicle operator distraction.

14. A method according to claim 10 wherein said $BC_R$ includes a target vehicle operator attention value indicative of a level of potential target vehicle operator distraction.

15. A method according to claim 10 wherein modifying includes increasing said reference vehicle headway distance if said $BC_R$ indicates less than an optimum braking capability.

16. A method according to claim 10 wherein modifying includes decreasing said reference vehicle headway distance if said $BC_T$ indicates less than an optimum braking capability.

17. An adaptive cruise control system for a reference vehicle comprising:
  a memory for storing reference vehicle data;
  a detection system for detecting a target vehicle;
  a receiver receiving target vehicle data from said detected target vehicle by way of an inter-vehicle communication network; and
  a controller coupled to said memory for adaptively controlling a speed of said reference vehicle to maintain a reference vehicle headway distance indicative of a desired separation between said reference vehicle and said target vehicle, wherein said reference vehicle headway distance is generated as a function of said reference vehicle data and said target vehicle data.

18. A system according to claim 17 wherein said reference vehicle data includes a braking capability value ($BC_R$) for said reference vehicle.

19. A system according to claim 18 wherein said target vehicle data includes a braking capability value ($BC_T$) for said target vehicle.

20. A system according to claim 17 wherein said reference vehicle data includes data comprising at least one of: a tire pressure value; a tire size value; a tread wear value; a tire temperature value; a vehicle weight value; target vehicle speed; or a road condition value.

* * * * *